ary Examiner—Leonard H. Gerin
United States Patent [19]

Cicognani et al.

[11] 4,099,422
[45] Jul. 11, 1978

[54] OIL RESISTANT TOOTHED BELT

[75] Inventors: Mario Cicognani, Milan; Bruno Mirabelli, Varese, both of Italy

[73] Assignee: Industrie Pirelli S.p.A., Milan, Italy

[21] Appl. No.: 742,073

[22] Filed: Nov. 15, 1976

[30] Foreign Application Priority Data

Dec. 5, 1975 [IT] Italy .............................. 30002 A/75

[51] Int. Cl.² .............................................. F16G 1/00
[52] U.S. Cl. .................................................. 74/231 C
[58] Field of Search ............... 74/231 C, 231 R, 233, 74/234

[56] References Cited

U.S. PATENT DOCUMENTS 3,937,094 2/1976 Cicognani .......................... 74/231 C
3,989,580 11/1976 Hoback et al. ................. 74/231 C X
4,002,082 1/1977 Waugh ............................... 74/231 C

*Primary Examiner*—Leonard H. Gerin
*Attorney, Agent, or Firm*—Stevens, Davis, Miller & Mosher

[57] ABSTRACT

A toothed belt adapted to be used while wet with a mineral oil has a ring of elastomeric material for a body, a tension resistant member inserted in the body, teeth on at least one side of the body, a rigid covering which is substantially non-deformable under flexion stresses for the teeth and intermediate groove surfaces made by doubling a rubberized fabric over an elastomeric layer as described in U.S. Pat. No. 3,937,094. The body, the teeth and rubberized fabric are all made from an oil resistant elastomer such as an epichlorohydrin rubber composition.

4 Claims, 1 Drawing Figure

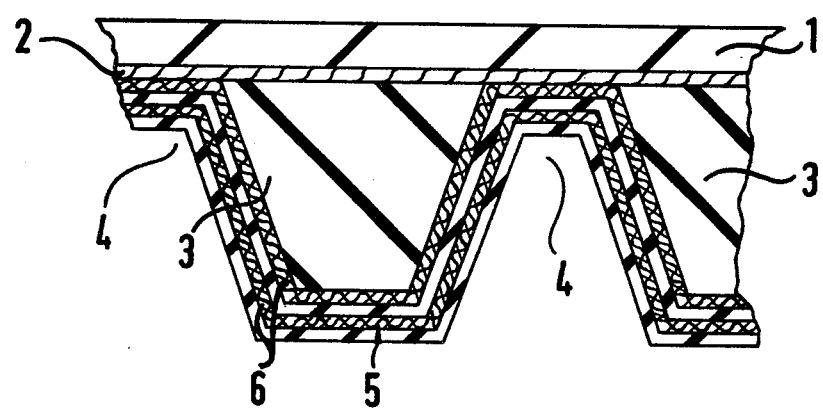

OIL RESISTANT TOOTHED BELT

This invention relates generally to toothed belts for use in the operation of mechanical devices and more particularly to an improved toothed belt of the type disclosed in my U.S. Pat. No. 3,937,094 issued Feb. 10, 1976.

A toothed belt having a body constituted by a ring of elastomeric material containing a tension resistant insert, a toothing of elastomeric material on at least one face of the belt body and a particular covering for the teeth and the grooves of the belt toothing is disclosed in my aforesaid patent. The belt disclosed in the patent has a covering for the teeth and the grooves of an extremely rigid layer which is practically non-deformable under flexion stresses in comparison with the elastomeric material forming the belt teeth. Two layers of fabric doubled together with an intermediate layer of an elastomeric material cover the teeth of the patented belt. The purpose of the covering is to prolong the useful life of the belt and at the same time to improve the behavior of the belt to avoid skipping. The patented belt serves these purposes because such belts have been shown with experimental tests to have a life time 100% longer than with the conventional toothed belts. Moreover, the belts also show an improved skip performance of 15 to 20% over the conventional toothed belts.

An object of the present invention is to improve the resistance of the toothed belt to the action of high temperature lubricating oils, generally used in motors, so that the belts can be used while wet with the lubricating oils without loss of the characteristics of the toothed belts of my aforesaid patent. Another object of the invention is to provide thermo-oil resistant toothed belts having a long life time and overall dimensions, i.e., width and layout, equal to that of the chains used in the transmissions of motor vehicles which adapt them to replace the chains without modification of the transmissions.

Other objects will become apparent from the following description with reference to the drawing which illustrates a portion of one embodiment of the invention in longitudinal section with parts enlarged for illustration purposes.

The foregoing objects and others are accomplished, generally speaking, by providing a toothed belt comprising a body having a ring of elastomeric material containing a tension resistant insert, a toothing of elastomeric material on at least one face of the belt body and a covering for the teeth and the grooves of the toothing which is extremely rigid and practically non-deformable under flexion stresses in comparison with the elastomeric material forming the teeth, the covering comprising two layers of rubberized fabric doubled together as disclosed in U.S. Pat. No. 3,937,094 issued Feb. 10, 1976, and characterized by the fact that the elastomeric material forming the belt body, the belt toothing and the rubberizing of the two fabrics doubled together for the covering of the belt toothing is a compound of elastomeric material which is resistant to motor oils whereby the toothed belts have a long life span when used while wet with or submerged in a high temperature oil.

Referring now to the drawing, the toothed belt of the present invention has a belt body 1 made of an oil resistant elastomeric composition containing a tension resistant structure formed by a plurality of cords 2, coplanar and parallel to one another, made of flexible and inextensible material, as, for example, fiberglass, steel threads and the like.

On one face of the belt body 1, there is a toothing constituted by a plurality of teeth 3 separated from one another by grooves 4.

On the surface of the teeth and the grooves of the toothed belt there is a covering 5 constituted by two rubberized fabrics 6 doubled together.

Also, the teeth 3 and the rubberizing of the fabrics 6 are of oil resistant elastomeric material.

In particular, as oil resistant elastomeric materials epichlorohydrin rubber compounds are contemplated.

As elastomeric material for constituting the toothed belt according to the present invention, the following one is particularly advantageous:

| | |
|---|---|
| epichlorohydrine polymer | 100 parts in weight |
| zinc stearate | 1 part in weight |
| carbon black N 550 | 50 parts in weight |
| minium (i.e. red lead $Pb_3O_4$) | 5 parts in weight |
| nickel-dibutyldithiocarbamate | 1 part in weight |
| 2-mercapto-imidazoline | 1.5 part in weight |

Experimental tests carried out on belts according to the present invention in comparison with conventional belts have given the results reported in the following table:

| | A | B | C |
|---|---|---|---|
| minimum values | >1000 | 500 | 80 |
| maximum values | >1000 | 700 | 200 | where:
A is the life time, given in hours, of the toothed belts according to the present invention; B is the life time, given in hours, of the same elastomeric material of the belts according to the present invention but with the covering of the toothing constituted by a single rubberized fabric; and C is the life time, given in hours, of toothed belts made with conventional elastomeric materials and with the covering of the toothing constituted by a single rubberized fabric.

The tests have been carried out on belts having equal dimensions and precisely on belts having the following characteristics:

| | |
|---|---|
| belt width | 12.7 mm |
| pitch of toothing | 9.525 mm |
| number of teeth | 46 |

For carrying out the tests an apparatus constituted essentially by a container containing an oil pump was used; the drive shaft of the pump is actuated by a toothed pulley of a toothed belt drive. The other toothed pulley of the drive is also encased in the container and it receives the action from an electric motor.

Oil in the container covers one of the two pulleys and at least ⅔ of the toothed belt; a heating means is provided for heating the oil.

The pump draws oil from the container and after making the oil circulate under pressure inside a duct, the pump sends it back, by means of a pressure reducing device, to the container where the oil is not under pressure.

The conditions by which the tests have been carried out are the following:

| | |
|---|---|
| oil temperature | 145° C. ± 5° C. |
| oil | SAE 10/50 |
| driving speed | 6500 revolutions per minute |
| oil pressure in the pump | from 6 to 8 atm |

This apparatus schematically represents the lubricating circuit of an internal-combustion engine in maximum thermal stress conditions.

As can be seen from the experimental tests reported above, the objects of the invention are achieved.

In order to achieve these objects, the particular type of the oil resistant elastomeric material and the particular type of covering for the belt toothing have a fundamental importance; of the two fundamental elements of the invention, the one which contributes the most to the advantageous results is the covering for the belt toothing, i.e., the covering for the belt toothing having two fabrics, rubberized with an oil resistant elastomeric material and doubled together.

This result is surprising and unexpected because it is not predictable that by using for the covering of the toothing only two rubberized fabrics doubled together, the belt will operate in the presence of high temperature oils for a longer time than conventional belts as demonstrated by the above test results.

The results are still much more unexpected if it is realized that for capillary diffusion of liquids in fabrics even if rubberized, the fabric should not be a substantial obstacle to the passing of any liquid, and therefore in particular to the passing of high temperature lubricating oils which migrate to the inside of the belt to reach the resistant insert at the toothing grooves (where a layer of elastomeric material for the protection of the resistant insert practically does not exist) and damage the belt producing a rapid failure of the belt.

Although a particular embodiment of the invention has been described and illustrated, it is understood that the invention includes within its scope any other alternative embodiments within the skill of those in the art.

What is claimed is:

1. In a toothed belt comprising a body having a ring of elastomeric material containing a tension resistant insert, a toothing of elastomeric material on at least one face of the belt body and a covering for the teeth and the grooves of the toothing which is extremely rigid and practically non-deformable under flexion stresses in comparison with the elastomeric material forming the teeth, said covering being constituted by two layers of rubberized fabric doubled together about an elastomeric layer, the improvement wherein the elastomeric material forming the belt body, the belt toothing and the rubberizing of the two fabrics doubled together for the covering of the belt toothing is a compound of elastomeric material resistant to oils whereby the toothed belt has a long life time when used in the presence of a high temperature oil.

2. The toothed belt of claim 1 wherein the compound of elastomeric material resistant to oils is an epichlorohydrin rubber.

3. The toothed belt of claim 1 wherein the elastomeric material is a compound based on epichlorohydrin rubber and has the following composition:

| | |
|---|---|
| epichlorohydrin polymer | 100 parts in weight |
| zinc stearate | 1 part in weight |
| carbon black N. 550 | 50 parts in weight |
| minium (i.e. red lead $Pb_3O_4$) | 5 parts in weight |
| nickel-dibutyldithiocarbamate | 1 part in weight |
| 2-mercapto-imidazoline | 1.5 parts in weight |

4. A toothed belt comprising an elastomeric continuous band, a reinforcing structure embedded in said band, a toothing on at least one face of the band and a covering for the toothing constituted by at least two layers of fabric doubled together with a layer of elastomeric material interposed therebetween, said covering being an extremely rigid layer which is substantially non-deformable by flexion stresses in comparison with the elastomeric or plastic material forming the toothing, said band, toothing and covering being an elastomeric composition which is resistant to hot oil.

* * * * *